(12) United States Patent
Haggerty et al.

(10) Patent No.: US 9,116,951 B1
(45) Date of Patent: *Aug. 25, 2015

(54) IDENTIFYING INFORMATION RESOURCES FOR CONTACT CENTER AGENTS BASED ON ANALYTICS

(71) Applicant: Noble Systems Corporation, Atlanta, GA (US)

(72) Inventors: Christopher S. Haggerty, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,008

(22) Filed: Jan. 23, 2015

Related U.S. Application Data

(63) Continuation of application No. 13/708,283, filed on Dec. 7, 2012, now Pat. No. 9,020,920.

(51) Int. Cl.
G06F 17/30 (2006.01)

(52) U.S. Cl.
CPC .............................. G06F 17/30424 (2013.01)

(58) Field of Classification Search
CPC ................................................ G06F 17/30864
USPC ................... 707/711, 726, 673, 741, E17.002
See application file for complete search history.

(56) References Cited

U.S. PATENT DOCUMENTS

| | | | |
|---|---|---|---|
| 5,794,224 A * | 8/1998 | Yufik | 706/14 |
| 6,272,216 B1 | 8/2001 | Vaios | |
| 6,856,986 B1 * | 2/2005 | Rossides | 1/1 |
| 7,318,031 B2 | 1/2008 | Bantz et al. | |
| 7,953,219 B2 | 5/2011 | Freedman et al. | |
| 8,150,021 B2 | 4/2012 | Geva et al. | |
| 8,175,007 B2 | 5/2012 | Jain et al. | |
| 8,326,643 B1 | 12/2012 | Eshkenazi et al. | |
| 8,401,529 B1 * | 3/2013 | Delker et al. | 455/414.1 |
| 2002/0059157 A1 | 5/2002 | Spooner et al. | |
| 2004/0008828 A1 | 1/2004 | Coles et al. | |
| 2004/0062364 A1 | 4/2004 | Dezonno et al. | |
| 2005/0266387 A1 * | 12/2005 | Rossides | 434/323 |
| 2006/0078862 A1 | 4/2006 | Goto et al. | |
| 2007/0195945 A1 | 8/2007 | Korenblit | |

(Continued)

OTHER PUBLICATIONS

Office Action Received for U.S. Appl. No. 14/624,637 dated May 22, 2015.

*Primary Examiner* — Baoquoc N To

(57) ABSTRACT

Various embodiments of the invention provide methods, systems, and computer program products for determining a pattern for communications conducted between agents at a contact center and contact parties. In particular embodiments, the pattern is based on a utilization of one or more information resources by the agents during the communications. Depending on the embodiment, the communications may comprise one or more of telephone calls, text messages, emails, and Web chats. In addition, in various embodiments, a particular information resource from among the one or more information resources is identified based on the pattern and is associated with a keyphrase found in at least two of the communications. Accordingly, as a result of the association, the particular information resource is made available to at least one agent at the contact center during a time the agent is fielding a subsequent communication in which the keyphrase is detected.

23 Claims, 7 Drawing Sheets

(56) References Cited

U.S. PATENT DOCUMENTS

| | | |
|---|---|---|
| 2009/0012826 A1 | 1/2009 | Eilam et al. |
| 2010/0106729 A1* | 4/2010 | Pan et al. .................. 707/747 |
| 2011/0010173 A1 | 1/2011 | Scott et al. |
| 2011/0033036 A1 | 2/2011 | Edwards et al. |
| 2011/0197206 A1 | 8/2011 | Deshmukh et al. |
| 2011/0307258 A1 | 12/2011 | Liberman et al. |
| 2013/0297625 A1 | 11/2013 | Bierner et al. |
| 2014/0324424 A1 | 10/2014 | Kim |

* cited by examiner

| Communication | Agent | Recommendations ||||| 
|---|---|---|---|---|---|---|
| | | 1 | 2 | 3 | 4 | 5 |
| 1 | Agent 1 | C | G | | | |
| 2 | Agent 2 | J | A | K | C | G |
| 3 | Agent 3 | E | F | H | | |
| 4 | Agent 2 | G | J | B | K | |
| 5 | Agent 3 | A | C | G | | |
| 6 | Agent 3 | C | J | K | | |
| 7 | Agent 4 | F | G | | | |
| 8 | Agent 2 | H | I | A | | |
| 9 | Agent 4 | C | D | | | |
| 10 | Agent 1 | J | I | G | K | |
| 11 | Agent 3 | E | F | A | | |
| 12 | Agent 2 | J | B | | | |
| 13 | Agent 1 | A | E | G | | |
| 14 | Agent 4 | G | D | | | |
| 15 | Agent 2 | J | K | G | | |

FIG. 4A

| Recommendation | Occurrences | Times Last |
|---|---|---|
| A | 5 | 2 |
| B | 2 | 1 |
| C | 5 | 0 |
| D | 2 | 2 |
| E | 3 | 0 |
| F | 3 | 0 |
| G | 9 | 6 |
| H | 2 | 1 |
| I | 2 | 0 |
| J | 6 | 0 |
| K | 5 | 4 |

FIG. 4B

IDENTIFYING INFORMATION RESOURCES FOR CONTACT CENTER AGENTS BASED ON ANALYTICS

CROSS-REFERENCE TO RELATED APPLICATION

The present application is a continuation of U.S. patent application Ser. No. 13/708,283 filed Dec. 7, 2012, and entitled "Identifying Information Resources for Contact Center Agents Based on Analytics" of which the contents are incorporated by reference in their entirety into the present application.

BACKGROUND

Contact centers are used by various organizations to provide communication channels to the organizations' customers. For example, various organizations may utilize contact centers so that customers may contact the organizations with regard to issues the customers may be having with the organizations' products and/or to place orders for the organizations' products. These customers may contact the contact centers using a number of different types of communications such as telephone calls, emails, text messages, Web chats, etc. Further, organizations may originate communications to their customers.

During a particular communication between a contact center agent and a party, the agent may make use of various types of information to assist the agent in fielding the communication with the party. For instance, a party may be having an issue with his wireless device and may call the wireless device manufacturer's contact center for assistance in addressing the issue. During the call, the agent assisting the party may query information resources to his workstation on how to address the party's issue with the wireless device. The quicker the agent can retrieve needed information and the more effective the information is in assisting the agent during the communication, the more likely the communication will be successful and the more likely the party interacting with the agent will be satisfied and happy. It is with respect to these considerations and others that the disclosure herein is presented.

BRIEF SUMMARY

In general, embodiments of the present invention provide computer program products, methods, systems, apparatus, and computing entities for determining a pattern for communications conducted between agents at a contact center and contact parties. In particular embodiments, the pattern is based on a utilization of one or more information resources by the agents during the communications. In addition, in particular embodiments, the communications are related to a topic. Depending on the embodiment, the communications may comprise one or more of telephone calls, text messages, emails, and Web chats.

Further, in various embodiments, a particular information resource is identified among the one or more information resources based on the pattern and is associated with a keyphrase found in at least two of of the communications. For instance, in particular embodiments, the pattern shows the particular information resource is an information resource that is most often utilized or most often utilized last during the communications. Accordingly, as a result of the association, the particular information resource is made available to at least one agent at the contact center during a time the agent is fielding a subsequent communication in which the keyphrase is detected.

Depending on the embodiment, the particular information resource may provide an agent with different information that may be helpful to the agent in fielding the communication. For instance, in one embodiment, the particular information resource may provide the agent with information relevant to an issue identified by a contact party involved in the communication. While in another embodiment, the particular information resource may provide the agent with information on various products and/or services. Lastly, depending on the embodiment, the particular information resource may be made available to the agent through a number of different mechanisms such as the agent's computer workstation.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIGS. 4A & 4B are an example of identifying information resources in accordance with various embodiments of the present invention.

DETAILED DESCRIPTION

Figure 1:
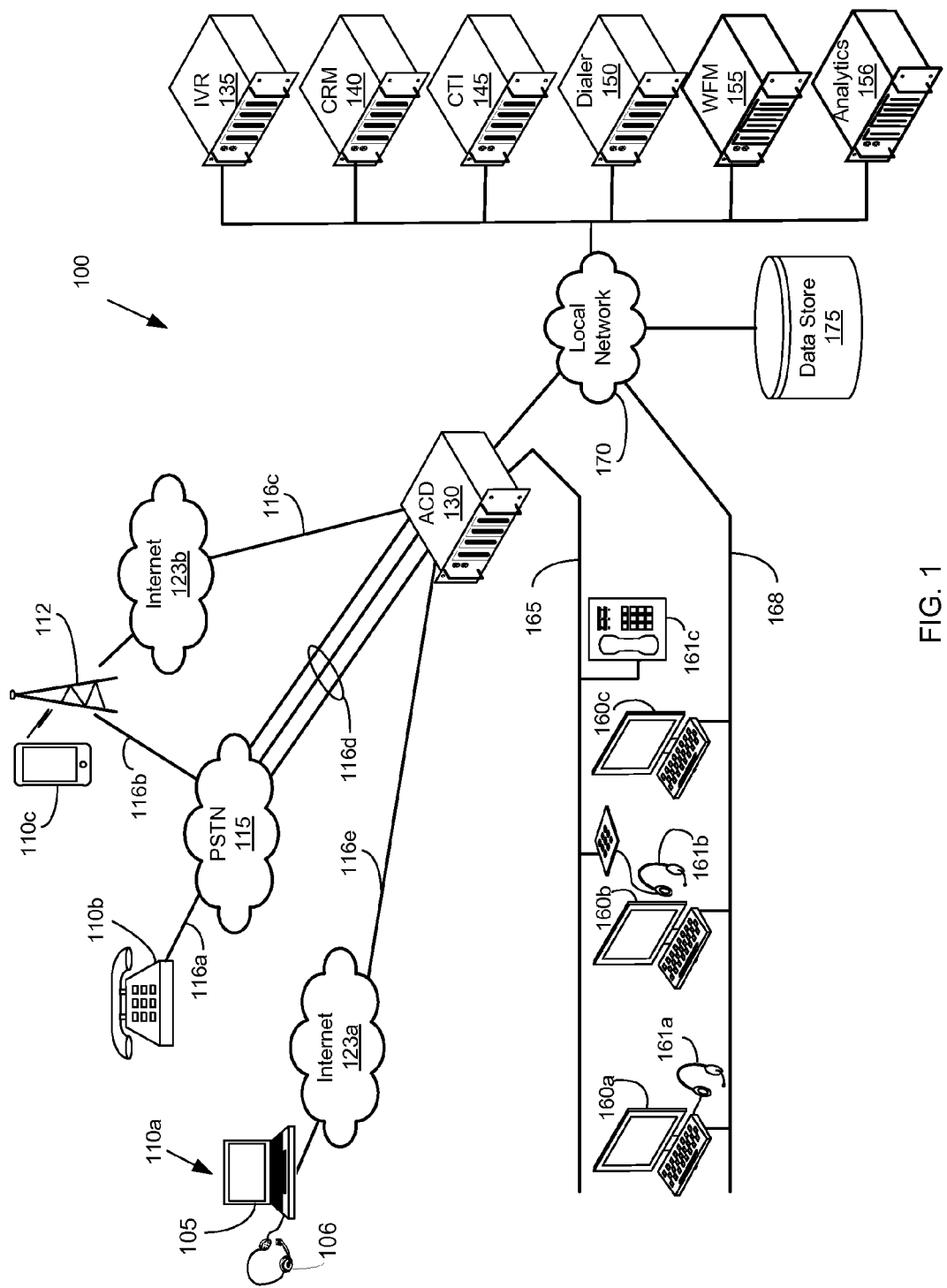
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. However, for the purposes of this disclosure, the term "call center" is used throughout, although it is understood that the two are synonymous.

Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160c, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control, monitor, and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. In addition, in particular embodiments, the CTI server 145 may also monitor various components of the architecture 100. For example, the CTI server 145 may monitor the number of calls received and/or made by the call center and/or monitor performance parameters of agents such as the average handling time of calls for individual agents. Further, the CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160*a*-160*c* over facilities 168 along with routing the call to the agent's workstation phone 161*a*-161*c*. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response system (e.g., server) ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160*a*-160*c*, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160*a*-160*c* to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116*c*, 116*d*, 116*e* to the PSTN 115 and/or Internet providers 123*a*, 123*b* for originating calls. After the calls are originated, a transfer operation by the ACD 130 (or dialer 150) may connect the call with an agent or a queue, or in some instances the IVR 135. In instances in which the call is placed in a queue, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another component that is employed in the call center architecture 100 shown in FIG. 1 is a workforce management system ("WFM") 155. In various embodiments, the WFM 155 maintains information and generates agents' schedules to effectively handle inbound/outbound communications. For instance, in particular embodiments, the WFM 155 maintains historical call volume information for call campaigns and generates forecasts for expected call volume based on the historical information to predict the number of agents needed to handle the call volume at a defined service level. The WFM 155 then applies the forecasts and information about available agents to generate work rosters of agents (e.g., schedules). That is, the WFM 155 schedules agents for work shifts according to the anticipated needs of the call campaigns.

Finally, in various embodiments, the call center architecture 100 may include one or more other components such as an analytics server 156 to perform various other functions. For example, in particular embodiments, the analytics server 156 may record communications conducted between agents and outside parties and perform analytics on these communications to extract information from the communications. For instance, in cases of telephone calls, the analytics server 156 may perform speech (e.g., voice) analytics on the telephone calls to extract information spoken during the telephone calls. In other instances involving emails communications and/or text message communications, the analytics server 156 may perform text analytics (e.g., text mining) to extract information found in such communications.

A number of different analytics approaches may be employed depending on the types of communications being analyzed and the embodiment. For example, in the case of telephone calls, the analytics server 156 may make use of one or more of a phonetics approach, large-vocabulary continuous speech recognition (LVCSR) approach, and/or direct phrase recognition approach in performing voice analytics on the telephone calls. In addition, depending on the embodiment, the analytics server 156 may be further configured to perform one or more functions with respect to the results produced from performing analytics on one or more communications. For instance, as detailed further below, in particular embodiments, the analytics server 156 may be configured to use analytics results to identify information resources that may be found useful to agents in fielding future communications. Further, in particular embodiments, the analytics server 156 may be configured to monitor communications between agents and outside parties in real-time in order to provide information resources during these communications that the agents may find useful in fielding the communications.

Finally, it is noted that in particular embodiments, one or more capabilities of the analytics server 156 may instead be incorporated into one or more other components found in the call center architecture 100. For instance, in particular embodiments, one or more capabilities of the analytics server 156 may be incorporated into the CRM server 140 and/or the CTI server 145. In addition, in particular embodiments, one or more capabilities of the analytics server 156 may be performed by a third-party provider as a service to the call center. For example, in one embodiment, a third-party provider may perform the analytics on the communications for the call center and provide the analytics results to the call center. In turn, the analytics server 156 may process the analytics results received from the third-party provider to identify information resources that may be found useful to agents in fielding future communications.

Although a number of the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150, WFM 155, analytics server 156, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

General Overview of Process

Figure 2:
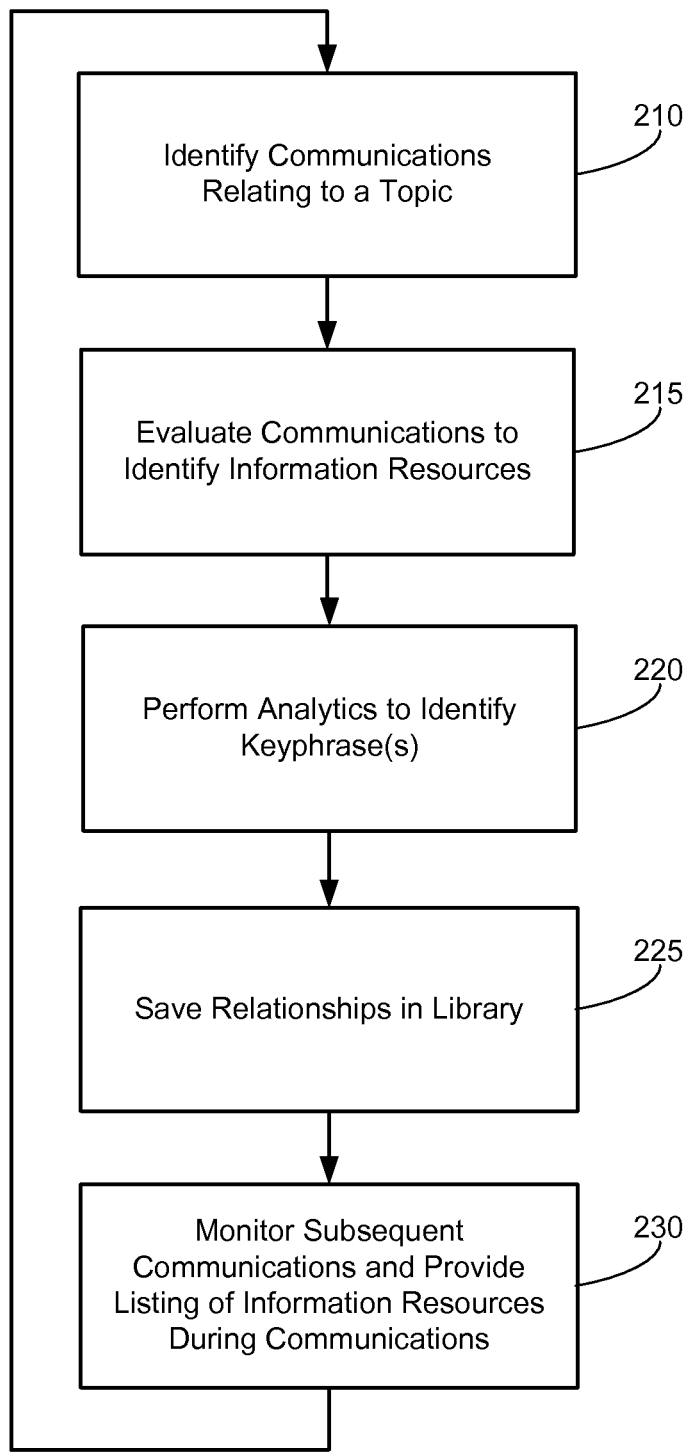
FIG. 2 provides a general process flow for identifying information resources an agent may find useful in fielding communications in accordance with various embodiments of the present invention.

FIG. 2 provides an overview of a process according to various embodiments for identifying one or more information resources that may be helpful to an agent fielding a communication for a particular topic and making available the identified information resources to the agent at the time the agent is fielding the communication for the particular topic. An example is now provided for proposes of explaining this process. In the example, a call center is involved with providing customer service for a particular banking institution. This banking institution provides a number of different products and services such as, for example, home improvement and car loans, checking accounts and services, savings accounts and services, and mortgage products and services for home purchases. Thus, in this example, agents at the call center may be receiving communications from customers (or potential customers) of the banking institution to inquire about any one of the products and services provided by the banking institution.

Turning now to FIG. 2, the process typically begins with identifying communications related to a topic, shown as Step 210. (As is discussed in more detail below, in various embodiments, the process is repetitive.) For instance, returning to the example, the call center may identify various communications fielded by agents over the past month in which the topic of conversation during the communications was the mortgage products and services provided by the banking institution. In this instance, the communications involve telephone calls received by the call center. However, as one of ordinary skill in the art can envision, the communications may not necessarily involve phone calls but may involve other forms of communications such as, for example, text messages, emails, or online (e.g., Web) chats. In addition, in various embodiments, a "communication" typically involves a contact between two parties (e.g., an agent and a party). That is, for instance, in particular embodiments, a communication may constitute a telephone call conducted between an agent and a party. While in other embodiments, a communication may constitute an exchange of multiple emails or text messages back-and-forth between the agent and the party. Further, the communications may also involve communications initiated by the call center such as outbound telephone calls. However, for purposes of this example, the identified communications involve telephone calls (e.g., inbound calls) received by the call center from parties inquiring about the banking institution's mortgage products and services.

In Step 215, the process continues with evaluating the identified communications to identify the information resources utilized by agents during these communications. Depending on the embodiment, information resources may include any number of different types of resources. For example, in particular instances, information resources may include information provided to agents' workstations during the communications. That is, for a particular communication, an agent may have queried information on the banking institution's various mortgage products and services from one or more data storage within the call center and the information on such products and services may have been displayed on the agent's workstation for use during the particular communication. In other instances, information resources may include other employees at the call center. For example, during a particular communication, an agent may have consulted or may have forwarded the communication to another agent at the call center that has specific knowledge with respect to the mortgage products and services provided by the banking institution. In other embodiments, information resources may be information indicated by an agent to a contact party. For instance, such information may be gleaned by application of analytics capabilities to the answers provided by the agent. While in other instances, information resources may include resources that are external to the call center. For example, one or more agents during the communications may have gathered (e.g., queried) information from an external source such as Freddie Mac that works with mortgage lenders. Those of ordinary skill in the art can envision numerous information resources that may be utilized by call center agents while fielding communications in light of this disclosure.

Further, depending on the embodiment, the evaluation of the communications may be carried out in a number of different ways. However, in many instances, the evaluation is typically carried out in an attempt to establish patterns with respect to how the different information sources were utilized during the communications. For instance, returning to the example, during the telephone calls involving parties who had called to inquire about the banking institution's mortgage products and services, a pattern may be established that for fifty-percent of the calls, agents were found to have queried information on the various types of mortgages the banking institution offers such as, for example, 30-year fixed, 15-year fixed, and variable interest rate mortgages. In addition, a second pattern may be established that for twenty-five percent of the calls involving agents with less than two-years of experience, these agents were found to have queried information on the requirements to qualify for Freddie Mac's refinancing program.

In addition to evaluating the communications to identify information resources, in particular embodiments, the process also includes performing some type of analytics on the communications to identify keyphrases that may be found in the communications, shown as Step 220. Similar to the evaluation conducted to identify information resources, depending on the embodiment, the analytics performed on the communications may be any one of a number of different types. For instance, returning to the example, since the communications involve telephone calls, speech (e.g., voice) analytics are used to identify keyphrases that may have been spoken during these phone calls. That is, depending on the embodiment, phrases spoken during one or more of these phone calls may be identified as "keys" based on any number of criteria that may be defined. For example, a phrase may be identified as a "key" if the phrase is found to have occurred a certain number of times in the phone calls (e.g., an absolute number of occurrences), is found to have been spoken in a certain percentage of the phone calls, is found to be spoken in phone calls involving a certain number or percentage of agents, and/or is found to have deviated from historical norms (e.g., the number of occurrences in which the word or phrase is being spoken in phone calls has recently increased). For purposes of this disclosure, the term "phrase" is understood to be any combination of words, numbers, and/or characters intending to have meaning. However, in certain instances, a phrase may only include a single word, number, or character. Those of ordinary skill in the art can derive numerous criteria that may be used to identify keyphrases in light of disclosure.

Thus, returning to the example involving the telephone calls inquiring about the banking institution's mortgage products and services, speech analytics may be performed on the telephone calls in which the agents had queried information on the various types of mortgages the banking institution offers to attempt to identify any keyphrases that may have been spoken during these telephone calls. In general, speech analytics comprises methods of analyzing speech to extract useful information about the content of the speech. As one of ordinary skill in the art will understand, depending on the circumstances, speech analytics may be carried out by using any number of different approaches such as, for example, the phonetic approach, the large-vocabulary continuous speech recognition (LVCSR) approach, and/or the direct phrase recognition approach.

In this instance, the phrase "mortgage product types" is determined to be a keyphrase that was spoken in a number of these telephone calls. In addition, with respect to the telephone calls involving agents that had queried information on the requirements to qualify for Freddie Mac's refinancing program, the phrase "Freddie Mac" is determined to be a keyphrase that was spoken in a number of these telephone calls. Finally, with respect to all of the telephone calls, the word "mortgage" may be identified as a keyphrase spoken in a number of these telephone calls.

At this point, in particular embodiments, one or more priorities may be established with respect to the identified keyphrases and associated information resources. For instance, returning to the example, a priority (e.g., a rule) may be established that whenever an agent is fielding a telephone call involving the banking institution's mortgage products and services and the keyphrase "mortgage product types" is spoken during the telephone call, the information resource on the banking institution's various types of mortgages it offers is made available to the agent (e.g., is provided on the agent's workstation). Likewise, a priority may be established that whenever an agent with two-years or less of experience is fielding a telephone call involving the banking institution's mortgage products and services and the keyphrase "Freddie Mac" is spoken during the telephone call, the information resource on the requirements to qualify for Freddie Mac's refinancing program is made available to the agent. In some instances, a link or mechanism may be provided for the information resource to make it available to the agent instead of automatically providing the information on the agent's workstation. Thus, in these instances, the agent selects the link or mechanism to retrieve the information if desired.

Once the information resources of interest and the associated keyphrases and priorities are established, the relationships with respect to the information resources of interest, associated keyphrases, and associated priorities are saved in a library in Step 225. For example, in one embodiment, a keyphrase is saved in one or more databases along with one or more identifiers for associated information resources and one or more identifiers for associated priorities (the priorities may be saved in the same databases or one or more separate databases). Thus, returning to the example, the keyphrase "mortgage product type" is saved in the library along with an identifier for the information resource on the banking institution's various types of mortgages it offers. In addition, this keyphrase is also saved along with an identifier for the priority (e.g., rule) that whenever an agent is fielding a telephone call involving the banking institution's mortgage products and services and the keyphrase "mortgage product types" is spoken during the telephone call, information on the banking institution's various types of mortgages it offers will be provided on the agent's workstation. Likewise, the same is saved with respect to the keyphrase "Freddie Mac" in the library.

Further, in particular embodiments, relationships between keyphrases may also be saved in the library. For instance, returning to the example, a relationship (e.g., an identifier for the keyphrase "mortgage product types" may be linked to the keyphrase "mortgage" and saved in the library. As a result, if the keyphrase "mortgage" is spoken in a conversation followed by the keyphrase "mortgage product types" being spoken, then the information resource for the banking institution's various types of mortgages is made available to the agent conducting the conversation. Likewise, in the example, an identifier for the keyphrase "Freddie Mac" may be linked to the keyphrase "mortgage" in the library. Accordingly, in these particular embodiments, a type of hierarchy can be established on how the information resources associated with the various keyphrases are to be provided to agents during communications.

Once the relationships have been saved to the library, the process continues in Step 230 with actively monitoring subsequent agent communications to determine when it may be appropriate to provide such information resources to an agent during a particular communication and to provide such sources at the appropriate times during the particular communication. Thus, returning to the example, the phone calls fielded by the agents for the banking institution are monitored in real-time to determine when to make available the information resources on the banking institution's various types of mortgages and the requirements to qualify for Freddie Mac's refinancing program to the agents. Depending on the embodiment, the real-time monitoring may be accomplished using various mechanisms. For instance, in particular embodiments, supervisors may monitor the communications to identify occurrences when the information resources should be made available to agents. However, in most instances, the real-time monitoring is carried out using some type of automated mechanism such as speech analytics or text analytics.

Therefore, in the example, speech analytics may be employed to monitor the phone calls received by the agents for the banking institution. During a particular phone call involving an agent with less than two-years of experience, the analytics server 156 found within the call center's architecture 100 monitors the particular phone call and detects the keyphrase "mortgage" being spoken by analyzing the conversation being conducted between the agent and the called party based on the keyphrases stored in the library. As a result, the analytics server 156 recognizes via the relationships stored in the library the keyphrases "mortgage product types" and "Freddie Mac" and continues to monitor the particular phone call to detect whether either of these keyphrases is spoken. Note that a priority (e.g., a rule) may be implemented that states that the information resource associated with the keyphrase "Freddie Mac" should only be made available to an agent if the agent has less than two-years of experience. For instance, in various embodiments, these priorities may also be stored in the library or in other storage along with the appropriate keyphrase identifiers. Thus, in these particular embodiments, the analytics server 156 queries the priorities to determine whether any priorities are associated with a particular keyphrase found in the library.

The analytics server 156 continues to monitor the conversation and detects the keyphrase "mortgage product types" is spoken. Accordingly, the analytics server 156 makes the information resource for the banking institution's various types of mortgages available to the agent by providing a link to this resource on the agent's workstation. Likewise, the analytics server 156 continues to monitor the conversation and detects the keyphrase "Freddie Mac." In this instance, the analytics server 156 queries the library and finds the priority about providing the information resource if the agent has less than two-years of experience. The analytics server 156 retrieves information on the agent and determines the agent has less than two-years of experience. As a result, the analytics server 156 also makes available the information resource for the requirements to qualify for Freddie Mac's refinancing program by providing the agent with a link to this resource on his workstation.

At this point, in various embodiments, the process may be repeated after a number of additional communications involving the keyphrases have been completed. In particular embodiments, this may occur to help fine-tune the library with respect to the keyphrases. This is reflected by the process looping from Step 230 back to Step 210. In other embodiments, once the Steps 210 thru 225 are performed and the library of relationships is created, then Step 230 may be repeated. In addition, in particular embodiments, periodic fine-tuning may occur. For instance, returning to the example, after a number of additional phone calls involving the banking institution's mortgage products and services have been completed, the process may be repeated. As a result of evaluating these communications, it may be determined that for the keyphrase "mortgage product types," thirty-six percent of the agents also make use of an information resource providing information on competitors' mortgage products and services so that the agents can provide a comparison between the banking institution and these competitors. Thus, the call center may also save a relationship between this keyphrase and the information resource on competitor's mortgage products and services in the library so this information resource may also be made available when this keyphrase is detected during a telephone call. In addition, in particular embodiments, new information resources and corresponding keyphrases may be identified and added to the library as a result of analyzing the additional communications. Thus, in various embodiments, the process may be executed as a closed-loop process so that the information resources provided to agents during communications can be continually improved and fine-tuned.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Resource Identification Module

Figure 3:
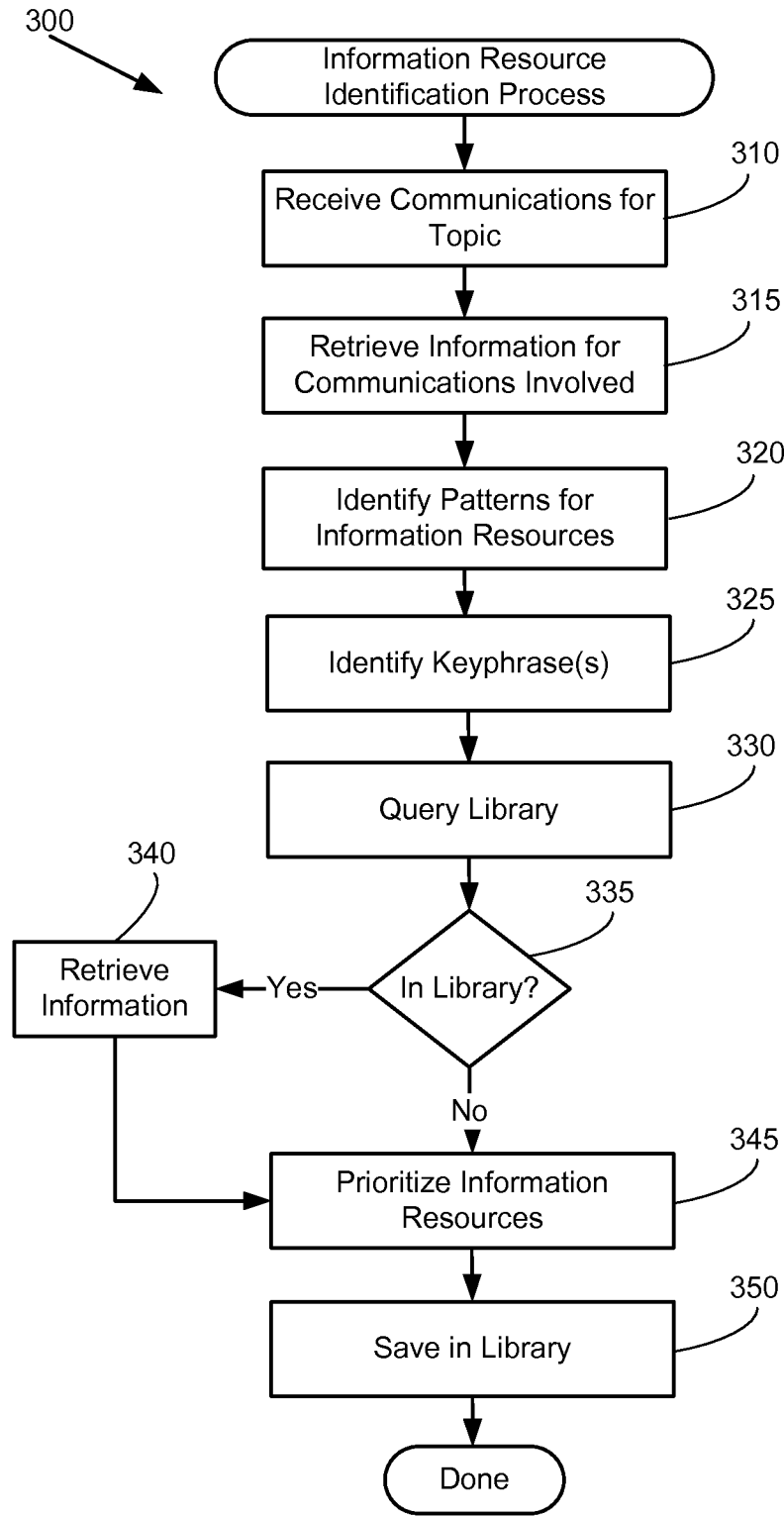
FIG. 3 is a flowchart illustrating a process for identifying information resources in accordance with various embodiments of the present invention.

Turning now to FIG. 3, additional details are provided regarding the process flow for identifying information resources and corresponding keyphrases according to various embodiments. Again, for purposes of simplicity, the description will focus on telephone calls. However, depending on the embodiment, the process may also be applicable to other types of communications such as, for example, emails, text messages, and Web chats. In particular, FIG. 3 is a flow diagram showing a resource identification ("RI") module for performing such functionality according to various embodiments of the invention. For example, the flow diagram shown in FIG. 3 may correspond to operations carried out by a processor in a computing device, such as the analytics server 156, as it executes the RI module stored in the computing device's volatile and/or nonvolatile memory.

The process 300 begins with the RI module receiving communications for a topic in operation 310. Depending on the circumstances, the topic can vary with respect to subject matter and scope. For instance, a call center may be receiving telephone calls with respect to a particular manufacturer's products. In this instance, the manufacturer may manufacture kitchen appliances such as refrigerators, stoves, dishwashers, and coffee makers. Thus, a topic for a group of communications may be telephone calls received pertaining to refrigerator products sold by the manufacturer. However, in other instances, the topic may be defined more narrowly such as telephone calls received pertaining to service issues with a particular refrigerator product or telephone calls received pertaining to a manufacturer's warranty for a particular refrigerator product. Those of ordinary skill in the art can envision numerous topic breakdowns that may be used for communications in light of this disclosure.

For purposes of describing the operations of the RI module, a call center that fields service calls for a computer manufacturer is used as an example. In this example, the computer manufacturer produces computers and various computer components such as printers. Thus, returning to FIG. 3, the RI module receives communications pertaining to telephone calls received from customers calling the call center requesting help for issues the customers are experiencing with printers produced by the manufacturer.

Depending on the embodiment, the received communications may include different information with respect to the communications. For instance, in particular embodiments, each of the received communications may include a copy of the recorded communication. While in other embodiments, each of the received communications may include information that identifies the communication such as a timestamp when the communication was fielded and an identifier for an agent that fielded the communication.

Thus, depending on the amount of information received along with the communications, in various embodiments, the RI module may retrieve information for each of the communications in operation 315. For instance, in particular embodiments, the RI module may retrieve information (or portions thereof) that was utilized by the agents in fielding the communications. For example, with respect to telephone calls received from customers requesting help with printer issues, the RI module may retrieve information utilized by the agents on their workstations in fielding the telephone calls. In this example, such information may include, for instance, the manufacturer's information on specific printer models and/or information on procedures the agents had the customers execute to attempt to resolve their printer issues.

Further, depending on the embodiment, the information retrieved for the various communications may come from a number of different resources. For instance, the resources may entail one or more storage media (e.g., databases) located within the call center. In this instance, for example, the RI module may retrieve information on procedures the agents had the customers execute for each telephone call by querying such information from one or more databases that stores records on each telephone call fielded by the call center. In other instances, the resources may entail one or more storage media located outside the call center. For example, the RI module may retrieve personal information on the customers involved in the telephone calls from an outside resource such as a credit card company or a common carrier provider that the computer manufacturer uses to ship products to customers. Those of ordinary skill in the art can envision several resources that may be used to gather information on the communications.

Returning now to the example, in this instance, the retrieved information indicates that the agents suggested to the customers during the calls to try one or more of the following procedures to attempt to fix the customers' printer issues: (A) turning the printer off and on; (B) replacing the ink cartridges in the printer, (C) reducing print quality for everyday output in print properties; (D) moving the printer closer to the device requesting the print in instances in which the printer is wireless; (E) checking the printer cable between the printer and the computer; (F) checking to see if the printer is properly configured for sharing (G) reinstalling the printer driver; (H) checking for a paper jam; (I) removing and reinstalling the printer spool; (J) removing one of the cartridges and trying to print in reserve mode; and (K) cleaning the paper sensor on the printer.

At this point, the IR module attempts to identify patterns for the various information resources used by the agents during the communications in operation 320. Depending on the embodiment, the IR module may accomplish this operation using a variety of methods. However, generally speaking, in various embodiments, the IR module makes use of a number of rules/guidelines and/or statistical methods in identifying patterns. For instance, returning to the example, guidelines may have been established by the call center for the IR module to evaluate the information resources with respect to how often each resource is used over the span of the communications and which information resources were typically used last before a call was terminated. These guidelines may have been established in this instance because the communications being evaluated deal with telephone calls involving agents helping customers to resolve printer issues. Therefore, logically it would seem that information resources used by agents frequently tend to suggest these resources often help the agents resolve the customers' printer issues and the information resources used last by the agents tend to suggest these resources resolved the customers' issues because the agents did not have to search for and use further resources to resolve the issue.

Turning now to FIGS. 4A and 4B, these figures provide a demonstration of the IR module using the above-mentioned guidelines. Specifically, FIG. 4A illustrates a table comprising the recommendations by the agents to the customers while fielding the telephone calls on printer issues. In this example, the recommendations involve fifteen communications handled by four different agents (e.g., Agents 1 thru 4 in the Agent column 410) and the information resources are broken down into separate recommendations 420. Thus, the letters found in the recommendations columns 420 match the letters provided above with respect to the individual procedures recommended by agents to the customers to resolve their printer issues. For example, Procedure A is turning the printer off and on, Procedure B is replacing the ink cartridges in the printer, and so forth.

The table displays the order in which the agent had the customer perform the different procedures for trying to resolve the customer's printer issue. That is, for any one communication, the agent recommended the customer first perform the procedure in the first recommendations column 430, recommended the customer second perform the procedure in the second recommendations column 440, recommended the customer third perform the procedure in the third recommendations column 450 if needed, recommended the customer fourth perform the procedure in the fourth recommendations column 460 if needed, and recommended the customer fifth perform the procedure in the fifth recommendations column 470 if needed. The second table in FIG. 4B shows the occurrences that each procedure was recommended to a customer and the number of times each procedure was the last one recommended to a customer.

The determination of what recommendations were made could be derived in various ways, including what information resources were accessed, and/or what instructions were conveyed by the agent. In addition, in particular embodiments, the information resources accessed may be stored in a log detailing the searches initiated by the agent, individuals consulted by the agent, or phrases spoken or typed by the agent.

From the results in the second table, one can see that Procedure G was recommended a total of nine times 480 and on six occasions 485 it was the last procedure recommended to a customer to perform to resolve the customer's printer issue. Therefore, in this example, the RI module may determine a pattern exists for recommending that a customer reinstall the printer driver to resolve the customer's printer issue. Further, the RI module may also determine that a second pattern exists that recommends cleaning the paper sensor on the printer to resolve a customer's printer issue. The RI module may make such a determination because this procedure (i.e., Procedure K) was recommended a total of five times 490 and on four occasions 495 this was the last procedure recommended to a customer to perform to resolve the customer's printer issue.

Returning now to FIG. 3, at this point, the RI module attempts to identify keyphrases present in the communications in operation 325. As previously mentioned, such identification may be accomplished in various embodiments by performing some form of analytics on the communications. For instance, in the example, speech (e.g., voice) analytics may be performed on the telephone calls involving customers calling for help with regard to printer issues to identify the frequency at which phrases are spoken during the telephone calls. Depending on the embodiment, the RI module may be configured to perform the analytics on the communications or may receive the results of the analytics from another source. That is, in some embodiments, a third-party performs analytics on the communications and provides the results to the RI module and the RI module uses the results to identify keyphrases present in the communications. Depending on the circumstances, this third-party may be another component within the call center or may be a provider outside the call center.

Thus, in various embodiments, the analytics typically performed on the communications involve identifying phrases that appear in the communications at a particular frequency (e.g., threshold). For example, the entity performing the analytics on the communications may identify keyphrases based on an absolute number of occurrences of a phrase appearing in the communications or a portion of the communications being greater than a threshold. However, in other instances, the entity may consider other factors such as, for example, the percentage of communications in which the phrase appears, the percentage of agents involved in the communications in which the phrase appears, and/or a deviation from a historical occurrence of the phrase in such communications (e.g., a recent increase of occurrences in which the phrase appears in communications).

Further, depending on the circumstances, the analytics may only be performed on a portion of the communications that were initially reviewed for identifying patterns for information resources. For instance, returning to the example, two patterns of interest were identified from the telephone calls dealing with customer having printer issues. These two patterns involved the agents recommending that customers reinstall the printer driver or recommending customers clean the paper sensor on the printer to resolve the customers' printer issues. Thus, in this instance, the analytics may only be performed on the communications in which the agents recommended at least one of these two procedures. That is, the analytics may only be performed on communications 1, 2, 4-7, 10, and 13-15 in FIG. 4A. This may be done because the call center may only be interested in finding keyphrases that are associated with these two information resources (e.g., these two procedures).

Therefore, in the example, The RI module identifies the keyphrase "printing too slowly" from the analytics results. The RI module makes this determination based on the fact that this phrase was spoken in a majority of the communications in which the agents recommended at least one of the procedures of interest. That is, the phrase "printing too slowly" was spoken a number of times over a threshold in the communications in which the agents recommended at least one of the procedures of interest.

It is further noted that, in various embodiments, the identification of certain keyphrases may be limited to exchanges made by the agent, the party, or both. Further, the identification of keyphrases may be limited to certain times during the communication. For example, identification of a keyphrase indicative of an issue may likely to be voiced by the contact party relatively early in the conversation. In addition, a keyphrase describing an issue may likely to be uttered in close temporal proximity to other keyphrases. For example, when asked what is the problem (with "problem" being a first keyphrase), the response is likely to follow with another keyphrase (e.g., "printing too slowly"). Application of such rules can help facilitate identification of the appropriate keyphrases.

In addition, it should be noted that in particular instances, the RI module may have identified additional keyphrases tied to these communications and/or may have identified separate keyphrases tied to the two procedures of interest. For example, the RI module may have identified the keyphrase "printing too slowly" from the analytics results for the communications in which the agents recommended to customers to reinstall the printer driver and may have identified another keyphrase "paper sticking" from the analytics results for the communications in which the agents recommended to customers to clean the paper sensor on the printer. However, in this instance, the identified keyphrase "printing too slowly" is tied to the communications involving both information resources (e.g., both procedures).

At this point, the RI module queries the library to determine whether the keyphrases and/or the information resources already have entries in the library in operation 330. That is, in the example, the RI module queries the library to determine whether the keyphrase "printing too slowly" or the information resources for the two procedures already have entries in the library. In operation 335, if the RI module determines there are entries in the library for the keyphrase "printing too slowly" and/or the information resources, the RI module retrieves the information from the library for the entries in operation 340. This operation is performed in various embodiments so that the RI module may use this information in establishing the priority for the information resources.

Thus, in operation 345, the RI module prioritizes the information resources. That is, in various embodiments, the RI module sets a priority (e.g., one or more rules) for how the information resources are to be made available to agents. For instance, returning to the example and back to FIG. 4B, the information resource on advising a customer to reinstall the printer driver happened to be the last recommendation made by agents to customers for six of the communications. While the information resource on advising a customer to clean the paper sensor on the printer happened to be the last recommendation made by agents to customers for four of the communications. Thus, as previously explained, it appears as though more often reinstalling the printer driver solves the customer's printer issue rather than having the customer clean the paper sensor. Therefore, the RI module may determine that in instances in which both of these procedures are to be made available to an agent (e.g., when the keyphrase "printing too slowly" is spoken during the telephone call), the procedure for advising a customer to reinstall the printer driver takes priority over the procedure for advising a customer to clean the paper sensor on the printer. That is, in instances in which both of these procedures are to be made available to an agent, the first recommendation communicated to an agent is to reinstall the printer driver and the second recommendation is to clean the paper sensor on the printer.

Depending on the embodiment, the RI module may set this priority using any one of a number of different mechanisms. For instance, in one embodiment, the RI module may number the information resources accordingly. For example, the RI module may number the procedure to advise a customer to reinstall the printer driver as one and the procedure to advise a customer to clean the paper sensor as two. While in another embodiment, the RI module may weight the information resources accordingly. For example, the RI module may apply a factor such as two to the procedure to advise a customer to reinstall the printer driver and may apply a factor such as one to the procedure to advise a customer to clean the paper sensor. Thus, in this example, a first information resource weighted higher than a second information resource takes priority over the second information resource. Those of ordinary skill in the art can envision other mechanisms for setting a priority for information resources in light of this disclosure.

Finally, in operation 350, the RI module saves the keyphrases and the information resources to the library. Typically, this operation involves the RI module saving some type of relationship between the keyphrases and the information resources in the library. For instance, in particular embodiments, the RI module saves some type of identifier along with the keyphrases and/or along with the information resources so that the relationships between the keyphrases and the information resources can be easily identified in the library.

For instance, returning to the example, the RI module may have an identifier for the keyphrase "printing too slowly" that the RI module saves along with the two information resources so that when the keyphrase is spoken during a telephone call, the information resources may be queried to identify the two information resources associated with this keyphrase. Similarly, in other instances, the RI module may save a first identifier for the first information resource and a second identifier for the second information resource along with the keyphrase so that when the keyphrase is spoken during a telephone call, the two information resources can be queried based on their associated identifiers.

Furthermore, depending on the embodiment, other information may be saved along with the keyphrases and associated information resources. In the example, the original communications that were received were associated with a particular topic of telephone calls received from customers having a printer issue. Thus, in this particular instance, the RI module may also associate an identifier for this topic with the keyphrase "printing too slowly" and/or with the two associated information resources in the library. As a result, when a telephone call is received by the call center from a customer who is having an issue with his printer, the telephone conversation may then be monitored to determine if the keyphrase "printing too slowly" is spoken. If so, the two information resources may be provided to the agent handling the telephone call.

Finally, in particular embodiments, other associated information resources may also be associated with the keyphrases and/or with the associated information resources in the library. For instance, in the example, the call center may have a document that can be provided to an agent to explain how an agent can guide a customer in reinstalling the printer driver on the customer's computer. Further, the call center may also have a document that explains where a customer can find the computer manufacturer's printer drivers on the Internet if the customer needs to download the proper driver before reinstalling it on the customer's computer. Thus, the RI module may associate identifiers for these two documents with the information resource for advising a customer to reinstall the printer driver in the library. Likewise, the call center may have a document that explains how to clean the paper sensor on the printer so that an agent may use this document to guide a customer through this process. Thus, the RI module may associate an identifier for this document with the information resource for advising a customer to clean the paper sensor on the printer in the library.

Accordingly, as a result of the RI module saving these priorities and associations in the library, the library is structured in a hierarchical fashion in various embodiments. For instance, again looking at the example, the RI module has saved the appropriate priorities and associations in the library to drive a hierarchy of making various resources available to an agent when an agent is fielding a telephone call from a customer having a printer issue and the keyphrase "printing too slowly" is spoken. Such a hierarchy according to one embodiment is shown in FIG. 5.

Figure 5:
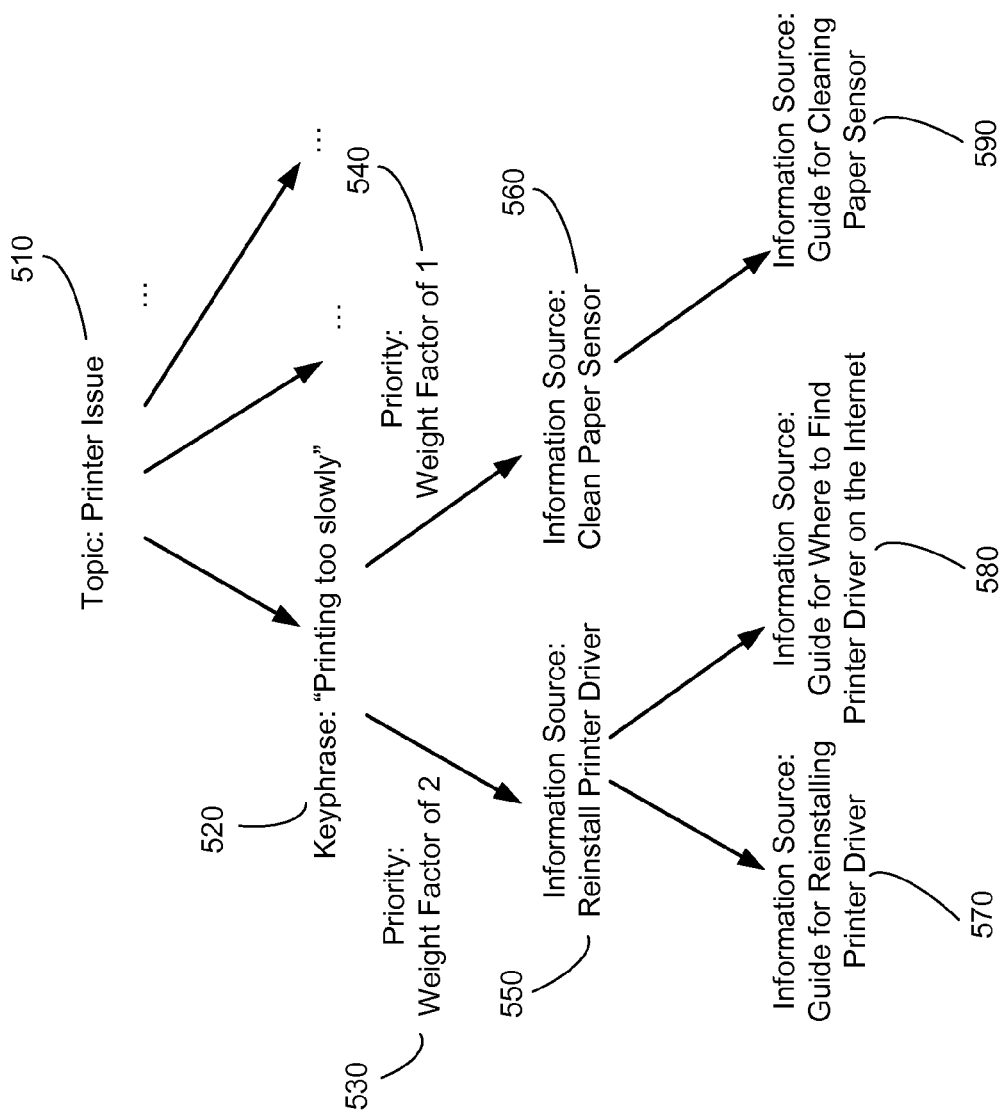
FIG. 5 is a hierarchy for providing information resources in accordance with various embodiments of the present invention.

That is, looking at FIG. 5 more specifically, suppose the call center receives an inbound call and the call is directed to an interactive voice response (IVR) system 135. The caller interacts with the IVR 135 and the IVR 135 requests the caller to identify what type of issue the caller is having by "pressing one for computer issues, two for external router issues, three for external hard drive issues, four for printer issues, and five for all other issues." In this instance, the caller presses four on his phone and the call is forwarded to an agent at the call center to handle. At this point, the call center is aware the caller has called because he is having a printer issue 510. Therefore, the library is queried to determine whether any keyphrases have been associated with the topic of callers having printer issues and the keyphrase "printing too slowly" 520 is found.

At this point, the conversation between the agent and the caller is monitored to determine if the keyphrase "printing too slowly" 520 is spoken. For instance, in particular embodiments, this type of monitoring can be carried out by performing some type of analytics (e.g., speech analytics) in real-time during the conversation. As the agent and caller converse about the caller's printer issue 510, the caller mentions that his "printer seems to be printing too slowly." Thus, the call center system (e.g., the analytics server 156) detects the keyphrase 520 has been spoken and as a result, the library is queried to see what relationships exist with respect to this keyphrase 520. In some instances, the keyphrase 520 may be associated with another keyphrase and then the conversation is further monitored to determine whether the associated subsequent keyphrase is spoken. However, in this instance, the keyphrase "printing too slowly" 520 is associated with the two information resources (e.g., the two procedures) 550, 560. Further, the information resource for advising the customer to reinstall the printer driver has a higher priority 530 than the priority 540 for the information resource for advising the customer to clean the paper sensor. In addition, the information resource for advising the customer to reinstall the printer driver is also associated with two additional information resources, a first information resource 570 for a document that can be used to guide the customer in reinstalling the printer driver on the customer's computer and a second information resource 580 for a document that explains where the customer can find the computer manufacturer's printer driver on the Internet. Thus, as a result of the hierarchy of relationships and priorities stored in the library, the agent's workstation displays a message that advises the agent to recommend to the customer to reinstall the printer driver on the customer's computer to try and address the customer's printer issue. That is, the agent's workstation displays the information resource 550 for recommending the customer reinstall the printer driver. In addition, a link to each of the additional resources 570, 580 is provided on the agent's workstation so that the agent can select the link to bring up the corresponding document on the agent's workstation. For instance, if the customer asks the agent where he can find the driver so that he can reinstall it, the agent may select the link for the document that explains where the customer can find the driver on the Internet.

At this point, if reinstalling the driver does not address the customer's printer issue, this may be identified through a number of different ways depending on the embodiment. For example, the conversation between the agent and customer may acknowledge that reinstalling the driver did not address the customer's printer issue and the monitoring of the conversation may detect this. In another example, the agent may make such an acknowledgement by selecting a button provided on his workstation or by requesting another recommendation. Accordingly, the agent is provided with the information resource 560 for advising the customer on cleaning the paper sensor on the printer and a link for the information resource 590 for a document on guiding the customer through the steps for cleaning the paper sensor.

Finally, in various embodiments, the library may be revised based on future communications involving the same topic and/or keyphrases. That is, in particular embodiments, once a number of communications have been fielded for a particular topic and/or keyphrase, the process discussed above is repeated so that the relationships, priorities, and/or information resources provided in the library may be revised and/or fine-tuned based on an analysis conducted on additional communications.

Communication Monitoring Module

Figure 6:
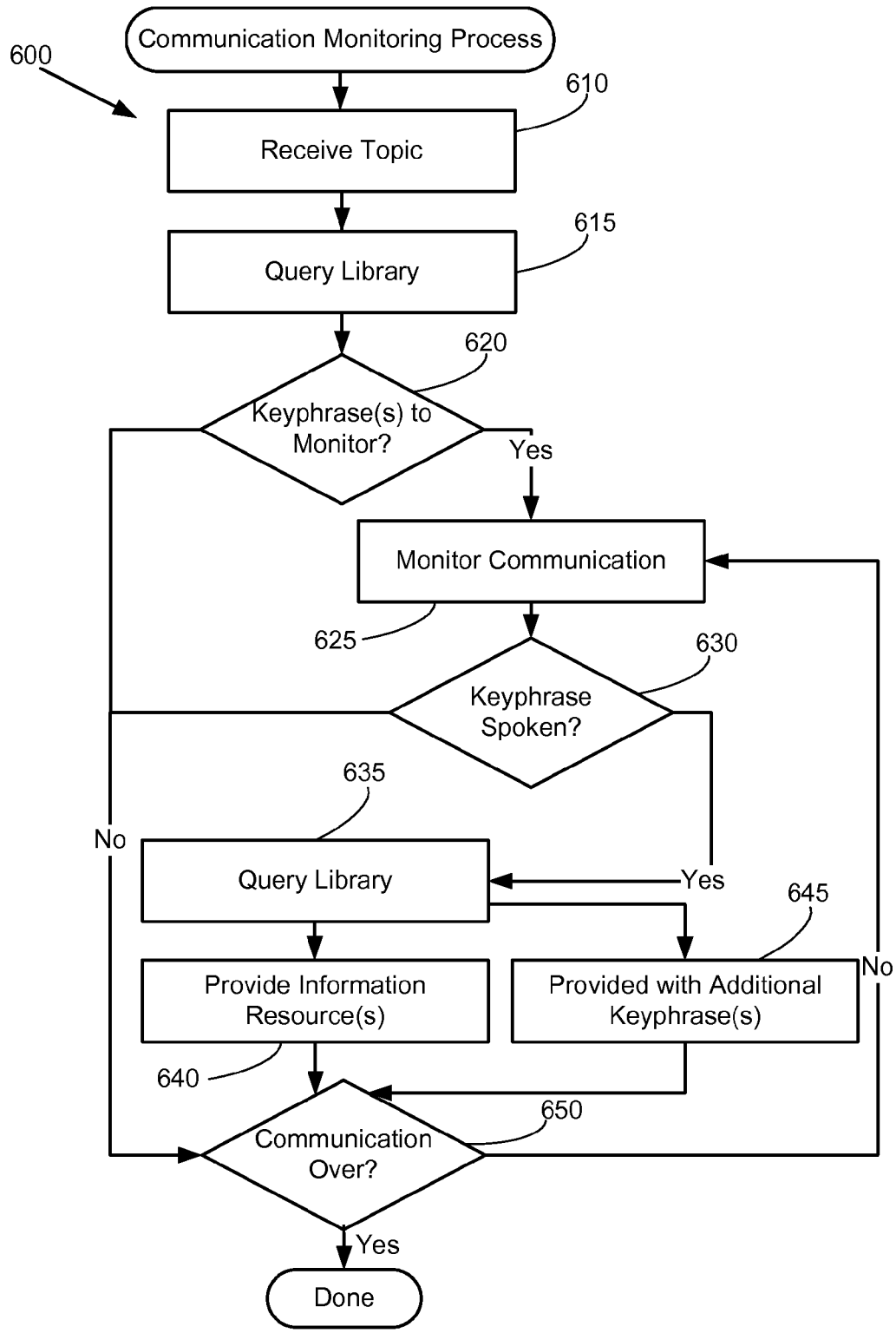
FIG. 6 is a flowchart illustrating a process for monitoring communications in accordance with various embodiments of the present invention.

Turning now to FIG. 6, additional details are provided regarding the process flow for monitoring a communication and providing information resources accordingly. Again, for purposes of simplicity, the description will focus on telephone calls. However, depending on the embodiment, the process may also be applicable to other types of communications such as, for example, emails, text messages, and Web chats. In particular, FIG. 6 is a flow diagram showing a communication monitoring ("CM") module for performing such functionality according to various embodiments of the invention. For example, the flow diagram shown in FIG. 6 may correspond to operations carried out by a processor in a computing device, such as the analytics server 156, as it executes the CM module stored in the computing device's volatile and/or nonvolatile memory.

For purposes of describing the CM module, another example is provided. In this example, the call center receives an inbound call for the computer manufacturer and the call is forwarded to an IVR 135. The IVR 135 determines that the caller is calling about a possible purchase and the IVR 135 has the call forwarded to an appropriate agent. At this point, the CM module is invoked to monitor the conversation between the caller and the agent. Thus, in operation 610, the process 600 begins with the CM module receiving the topic associated with the telephone call. In this instance, the topic is "sales," "purchases," or some other similar topic. In turn, in operation 615, the CM module queries the library to determine whether any keyphrases exist in the library that the CM module should monitor the conversation to detect if such keyphrases are spoken. In this instance, the library has several keyphrases associated with products the computer manufacturer sells to monitor in the conversation such as, for example, "computer," "router," "printer," and "monitor." Thus, in operation 620, the CM module determines that there are keyphrases the module should monitor the conversation between the agent and the caller to detect if such keyphrases are spoken during the conversation.

In various embodiments, the CM module may be configured to monitor for certain keyphrases at certain times in the communication, or from exchanges originating from a particular entity, e.g., the caller or the agent. For example, a subject matter of the issue is likely to occur at the beginning of a call. In some embodiments, certain information may be first collected, such as the caller's name, account number, etc. At this point, the caller may then state the purpose of the call. In addition, in particular embodiments, the CM module may be configured to monitor for keyphrases based on certain time periods. Further, the agent may be trained to repeat the issue. For example, if the agent responds by stating "So, from what I understand, you are looking to purchase a new monitor." Thus, the CM module may be configured to monitor the agent's response for the keyphrase "purchase" and then to search for another keyphrase located in proximity (e.g., "monitor").

As a result, the CM module begins to monitor the telephone call in operation 625. Depending on the embodiment, the CM module may monitor the telephone call using any number of different techniques. However, in many instances, the technique utilized by the CM module may be dependent on the call center's capabilities and the type of communication being monitored. For instance, if the communication is text messaging, the CM module may utilize text analytics to detect if one of the keyphrases is typed in a text message.

Likewise, if the communication is a telephone call, like in the example, the CM module may utilize speech analytics to determine if one of the keyphrases is spoken during the telephone call. Whatever the technique utilized, in various embodiments, the CM module typically needs to be able to monitor the telephone call in virtual real-time so that keyphrases can be identified in a timely fashion and the appropriate information resources can be provided to the agent at appropriate times.

Thus, in operation 630, the CM module determines whether a keyphrase has been identified in the communication. That is, returning to the example, the CM module determines whether any of the keyphrases "computer," "router," "printer," and "monitor" are spoken during the conversation between the agent and the caller. In this instance, the caller informs the agent that he is "looking to buy a new monitor for my home computer." Accordingly, the CM module identifies the keyphrase "monitor" being spoken and queries the library to determine what action to take as a result in operation 635.

For instance, in the example, the keyphrase "monitor" is associated with an information resource providing a listing of the monitors available for sale by the computer manufacturer. Accordingly, the CM module provides the information resource to the agent on his workstation in operation 640. Furthermore, the keyphrase "monitor" is also associated with information resources, each resource providing specific information on each individual model of monitor the computer manufacturer sells. However, in this instance, these information resources are also associated with a priority (e.g., a rule) in which the resources are only to be made available to the agent if the agent has less than two-years of experience. This is because such agents may not be as familiar with the computer manufacturer's monitor models as would be agents that have more years of experience. Thus, in this instance, the CM module determines whether the agent handling the telephone call has less than two-years of experience. For example, in one embodiment, the CM module uses an identifier for the agent and queries the agent's qualifications from some source (such as the WFM 155, for example) to determine the number of years of experience the agent has. If it is less than two-years, the CM module provides links to the information resources providing specification information on each individual model of monitor sold by the computer manufacturer.

Further, the keyphrase "monitor" is also associated with keyphrases for each of the individual models of monitor sold by the computer manufacturer. Thus, in operation 645, the CM module is provided with these additional keyphrases to monitor for in the conversation being conducted by the agent and the caller. At this point, the CM module determines whether the telephone call has concluded between the agent and the caller in operation 650. If not, then the CM module continues with monitoring the telephone call in operation 625.

As the conversation continues between the agent and the caller, the caller tells the agent that he is interested in the manufacturer's model "3790" of monitor. Accordingly, the CM module determines the keyphrase "3790" has been spoken in operation 630 and queries the library in operation 635. In turn, the CM module provides the agent with an information resource on what computer systems are compatible with this model of monitor in operation 640 and returns to monitoring the conversation in operation 620. The agent conveys the information provided in the resource on what computer systems are compatible with this model and the caller determines that this particular model is not compatible with his home computer. Therefore, the caller expresses that he has interest in the manufacturer's "3800" model of monitor. Again, the CM module determines the keyphrase "3800" has been spoken in operation 630 and queries the library in operation 635. This time, the CM module provides an information resource providing pricing options and upgrades for this model of monitor in operation 640 and returns to monitoring the conversation in operation 625.

The agent conveys this information to the caller and the caller expresses that he is interested in this model of monitor's "wireless" capabilities. In turn, the CM module determines the keyphrase "wireless" has been spoken in operation 630 and queries the library in operation 635. This time, the CM module provides the agent with an information resource on the warranty options and pricing on the 3800 model of monitor with wireless capabilities. The agent conveys the information to the caller and the caller expresses that he would be interested in a "five-year" warranty. The CM module determines the keyphrase "five-year" has been spoken in operation 630. At this point, the CM module queries the library in operation 635 and provides an information resource comprising a questionnaire for collecting information from the caller for purchasing the monitor in operation 640. The caller completes the purchase of the monitor and completes the call with the agent. In turn, the CM module determines the communication is over in operation 650.

Exemplary Processing Device Architecture

Figure 7:
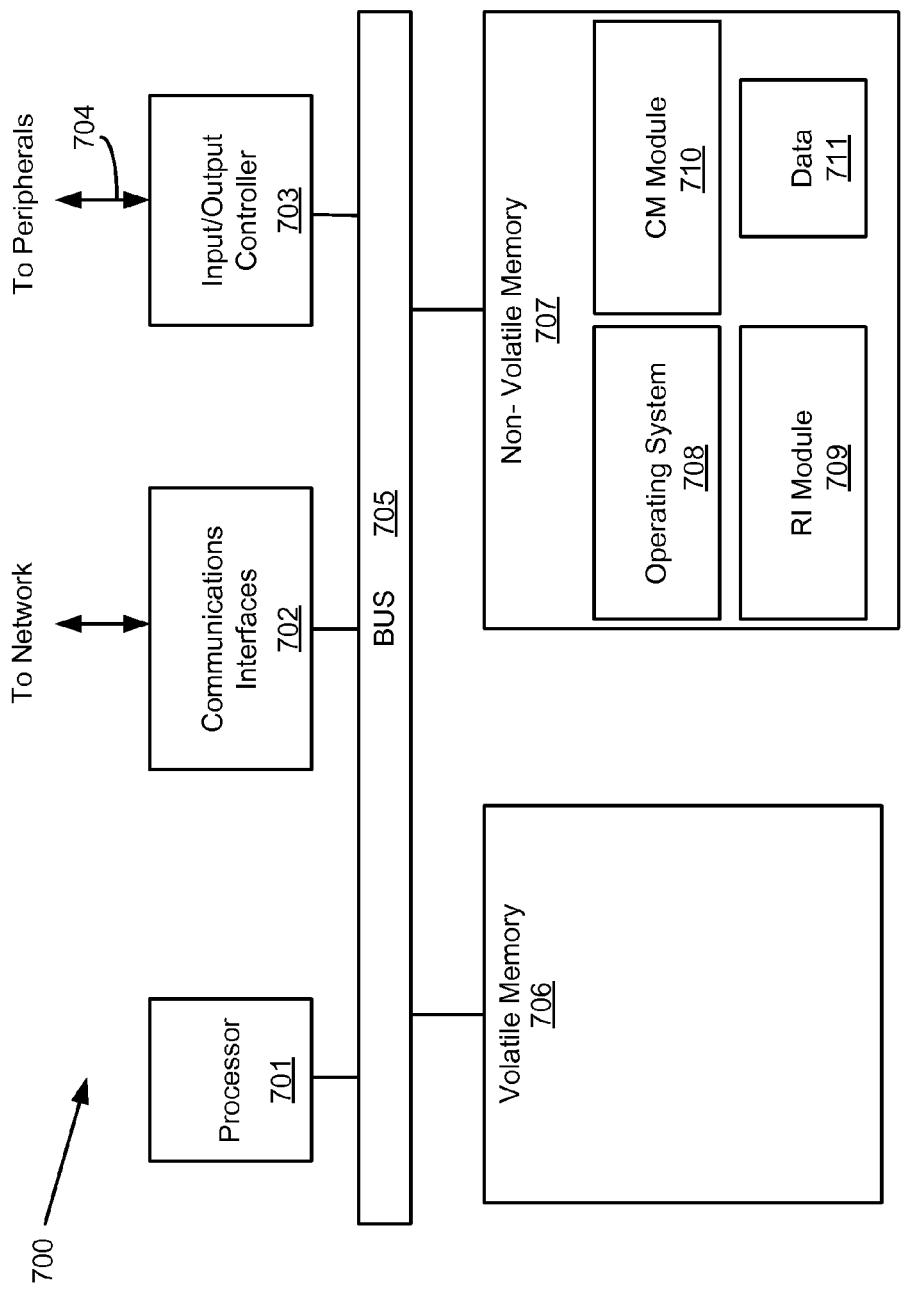
FIG. 7 is an exemplary schematic diagram of a system used in one embodiment of the call center architecture to practice the technologies disclosed herein.

As discussed in conjunction with FIG. 1, the call center architecture 100 may comprise various components that comprise a processing system. FIG. 7 is an exemplary schematic diagram of a processing system 700 that may be used in an embodiment of the call center architecture 100 to practice the technologies disclosed herein such as, for example, the ACD 130, IVR 135, CRM server 140, CTI server 145, dialer 150, WFM 155, analytics server 156, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 701 that may communicate with other elements within the processing system 700 via a bus 705. The processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 702 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface 704, such as, but not limited to: a keyboard, a mouse, a touch screen/display input, microphone, pointing device, etc. The input/output controller 703 may also communicate with output devices or peripherals, such as displays, printers, speakers, headsets, banner displays, etc.

The processor 701 may be configured to execute instructions stored in volatile memory 706, non-volatile memory 707, or other forms of computer-readable storage media accessible to the processor 701. The volatile memory 706 may comprise various types of memory technologies, including, but not limited to: random access memory ("RAM"), dynamic random access memory ("DRAM"), static random access memory ("SRAM"), and other forms well known to those skilled in the art. The non-volatile memory 707 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. Specifically, the non-volatile memory 707 may store one or more computer program modules, such as a RI module 709 and a CM module 710, and/or operating system code 708 containing instructions for performing the process and/or functions associated with the technologies disclosed herein. In addition, the RI module 709 and/or CM module 710 may also access, generate, or store data 711 in the non-volatile memory 707, as well as in the volatile memory 706. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the processor 701. These may form a part of, or may interact with, the RI module 709 and/or the CM module 710.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method comprising the steps of:
   determining a pattern for communications conducted between agents at a contact center and contact parties by an analytics processing system, the pattern being based on a utilization of one or more information resources by the agents during the communications, the one or more information resources providing different information that may have been helpful to the agents in fielding the communications;
   selecting a particular information resource from among the one or more information resources based on the pattern;
   identifying a keyphrase found in at least two of the communications based on certain criteria by the analytics system; and
   associating the particular information resource with the keyphrase, wherein the particular information resource is made available to at least one agent at the contact center during a time the at least one agent is fielding a subsequent communication in which the keyphrase is detected.

2. The method of claim 1, wherein the pattern shows the particular information resource is an information resource most often utilized last during the communications.

3. The method of claim 1, wherein the pattern shows the particular information resource is an information resource most often utilized during the communications.

4. The method of claim 1 further comprising the step of identifying the communications by the analytics processing system based on the communications being related to a topic.

5. The method of claim 1, wherein the communications comprise one or more of telephone calls, text messages, emails, and Web chats.

6. The method of claim 1, wherein the particular information resource provides the at least one agent with information relevant to an issue identified by a contact party involved in the subsequent communication.

7. The method of claim 1, wherein the particular information resource is made available to the at least one agent through a computer workstation being used by the at least one agent.

8. A non-transitory, computer-readable medium comprising computer-executable instructions for causing one or more computer processors of an analytics processing system to:
   determine a pattern for communications conducted between agents at a contact center and contact parties, the pattern being based on a utilization of one or more information resources by the agents during the communications, the one or more information resources providing different information that may have been helpful to the agents in fielding the communications;
   identify a particular information resource from among the one or more information resources based on the pattern;
   identify a keyphrase found in at least two of the communications based on certain criteria; and
   associate the particular information resource with the keyphrase, wherein the particular information resource is made available to at least one agent at the contact center during a time the at least one agent is fielding a subsequent communication in which the keyphrase is detected.

9. The non-transitory, computer-readable medium of claim 8, wherein the pattern shows the particular information resource is an information resource most often utilized last during the communications.

10. The non-transitory, computer-readable medium of claim 8, wherein the pattern shows the particular information resource is an information resource most often utilized during the communications.

11. The non-transitory, computer-readable medium of claim 8, wherein the computer-executable instructions further cause the one or more computer processors to identify the communications based on the communications being related to a topic.

12. The non-transitory, computer-readable medium of claim 8, wherein the communications comprise one or more of telephone calls, text messages, emails, and Web chats.

13. The non-transitory, computer-readable medium of claim 8, wherein the particular information resource provides the at least one agent with information relevant to an issue identified by a contact party involved in the subsequent communication.

14. The non-transitory, computer-readable medium of claim 8, wherein the particular information resource is made available to the at least one agent through a computer workstation being used by the at least one agent.

15. An analytics processing system comprising:
at least one computer processor configured to:
  determine a pattern for communications conducted between agents at a contact center and contact parties, the pattern being based on a utilization of one or more information resources by the agents during the communications, the one or more information resources providing different information that may have been helpful to the agents in fielding the communications;
  identify a particular information resource from among the one or more information resources based on the pattern;
  identify a keyphrase found in at least two of the communications based on certain criteria; and
  save in memory an association between the particular information resource and the keyphrase, wherein the particular information resource is made available to at least one agent at the contact center during a time the at least one agent is fielding a subsequent communication in which the keyphrase is detected.

16. The analytics processing system of claim 15, wherein the pattern shows the particular information resource is an information resource most often utilized last during the communications.

17. The analytics processing system of claim 15, wherein the pattern shows the particular information resource is an information resource most often utilized during the communications.

18. The analytics processing system of claim 15, wherein the at least one computer processor is configured to identify the communications based on the communications being related to a topic.

19. The analytics processing system of claim 15, wherein the communications comprise one or more of telephone calls, text messages, emails, and Web chats.

20. The analytics processing system of claim 15, wherein the particular information resource provides the at least one agent with information relevant to an issue identified by a contact party involved in the subsequent communication.

21. The analytics processing system of claim 15, wherein the particular information resource is made available to the at least one agent through a computer workstation being used by the at least one agent.

22. A method comprising the steps of:
determining a pattern for communications conducted between agents at a call center and contact parties by an analytics processing system, the pattern being based on a utilization of one or more information resources by the agents during the communications, the one or more information resources providing different information that may have been helpful to the agents in fielding the communications;
identifying a particular information resource from among the one or more information resources based on the pattern;
identifying a keyphrase found in at least two of the communications based on certain criteria by the analytics processing system;
associating the particular information resource with the keyphrase;
monitoring a subsequent communication being conducted by a particular agent of the contact center and a contact party in real-time by the analytics processing system; and
in response to detecting an occurrence of the keyphrase during the monitoring, making the particular information resource available to the particular agent.

23. A non-transitory, computer-readable medium comprising computer-executable instructions for causing one or more computer processors of an analytics processing system to:
determine a pattern for communications conducted between agents at a contact center and contact parties, the pattern being based on a utilization of one or more information resources by the agents during the communications, the one or more information resources providing different information that may have been helpful to the agents in fielding the communications;
identify a particular information resource from among the one or more information resources based on the pattern;
identify a keyphrase found in a plurality of the communications based on certain criteria;
associate the particular information resource with the keyphrase;
monitor a subsequent communication being conducted by a particular agent of the contact center and a contact party in real-time; and
in response to detecting an occurrence of the keyphrase during the monitoring, make the particular information resource available to the particular agent.

* * * * *